United States Patent
Gormley et al.

(10) Patent No.: US 10,724,476 B2
(45) Date of Patent: Jul. 28, 2020

(54) LOCKING APPARATUS FOR A THRUST REVERSER TRANSLATING SLEEVE

(71) Applicant: Rohr, Inc., Chula Vista, CA (US)

(72) Inventors: Timothy Gormley, Bonita, CA (US); Imad D. Ghandour, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 455 days.

(21) Appl. No.: 15/470,339

(22) Filed: Mar. 27, 2017

(65) Prior Publication Data

US 2018/0274485 A1   Sep. 27, 2018

(51) Int. Cl.
  *F02K 1/76*   (2006.01)

(52) U.S. Cl.
  CPC .............. *F02K 1/766* (2013.01); *F02K 1/763* (2013.01); *F05D 2250/312* (2013.01); *F05D 2260/30* (2013.01)

(58) Field of Classification Search
  CPC .... F02K 1/763; F02K 1/766; F05D 2250/312; F05D 2260/30
  See application file for complete search history.

(56) References Cited

U.S. PATENT DOCUMENTS

| | | | |
|---|---|---|---|
| 6,021,636 A | 2/2000 | Johnson et al. | |
| 6,584,763 B2 | 7/2003 | Lymons et al. | |
| 6,625,972 B1 | 9/2003 | Sternberger | |
| 8,018,696 B2 | 9/2011 | Ahrendt | |
| 9,109,541 B2 | 8/2015 | Channel | |
| 2009/0013664 A1* | 1/2009 | Jones | F02K 1/09 60/228 |
| 2009/0326783 A1 | 12/2009 | Calmelat et al. | |
| 2013/0062433 A1 | 3/2013 | Vauchel et al. | |
| 2013/0312387 A1* | 11/2013 | West | F02K 1/09 60/226.2 |
| 2016/0131081 A1 | 5/2016 | Maalioune et al. | |
| 2016/0333825 A1 | 11/2016 | Roberts | |
| 2016/0363097 A1* | 12/2016 | Foutch | F02K 1/72 |
| 2017/0009705 A1 | 1/2017 | Byrne | |
| 2018/0274485 A1* | 9/2018 | Gormley | F02K 1/766 |

OTHER PUBLICATIONS

European Search Report for EP Application No. 18164412 dated Oct. 18, 2018.

\* cited by examiner

*Primary Examiner* — Vicky A Johnson
(74) *Attorney, Agent, or Firm* — Getz Balich LLC (57) ABSTRACT

An assembly is provided for an aircraft propulsion system with an axial centerline. The assembly includes a translating sleeve, a sleeve actuator and a locking apparatus. The sleeve actuator is connected to the translating sleeve. The sleeve actuator is configured to move the translating sleeve along the axial centerline between a stowed position and a deployed position. The locking apparatus includes a lock and a lock actuator. The lock comprises a locking element. The lock actuator is configured to move the locking element between a locked position and an unlocked position. The locking element is configured to lock the translating sleeve in the stowed position when the locking element is in the locked position. A first portion of the locking apparatus axially overlaps the sleeve actuator along the axial centerline. A second portion of the locking apparatus does not axially overlap the sleeve actuator along the axial centerline.

12 Claims, 7 Drawing Sheets

LOCKING APPARATUS FOR A THRUST REVERSER TRANSLATING SLEEVE

BACKGROUND

1. Technical Field

This disclosure relates generally to a thrust reverser for an aircraft propulsion system and, more particularly, to a control system for locking and unlocking a translating sleeve of the thrust reverser.

2. Background Information

A thrust reverser for an aircraft propulsion system may include an axial translating sleeve. The translating sleeve may be driven axially between a forward stowed position and an aft deployed position by a set of actuators. Each of these actuators may be configured with a lock to prevent unintended deployment of the translating sleeve. The thrust reverser may also include a tertiary (e.g., backup) lock, which directly locks the translating sleeve to a stationary structure. Various types and configurations of tertiary locks are known in the art. While these known tertiary locks have various advantages, there is still room in the art for improvement.

SUMMARY OF THE DISCLOSURE

According to an aspect of the present disclosure, an assembly is provided for an aircraft propulsion system with an axial centerline. The assembly includes a translating sleeve, a sleeve actuator and a locking apparatus. The sleeve actuator is connected to the translating sleeve. The sleeve actuator is configured to move the translating sleeve along the axial centerline between a stowed position and a deployed position. The locking apparatus includes a lock and a lock actuator. The lock is configured as or otherwise includes a locking element. The lock actuator is configured to move the locking element between a locked position and an unlocked position. The locking element is configured to lock the translating sleeve in the stowed position when the locking element is in the locked position. A first portion of the locking apparatus axially overlaps the sleeve actuator along the axial centerline. A second portion of the locking apparatus does not axially overlap the sleeve actuator along the axial centerline.

According to another aspect of the present disclosure, another assembly is provided for an aircraft propulsion system with an axial centerline. This assembly includes a translating sleeve, a sleeve actuator and a locking apparatus. The sleeve actuator is connected to the translating sleeve. The sleeve actuator is configured to axially translate the translating sleeve along the axial centerline between a stowed position and a deployed position. The locking apparatus includes a lock and a lock actuator. The lock is configured as or otherwise includes a locking element. The lock actuator is configured to move the locking element between a locked position and an unlocked position. The locking element is configured to lock the translating sleeve in the stowed position when the locking element is in the locked position. The lock actuator at least partially axially overlaps the sleeve actuator along the axial centerline. The lock is disposed an axial distance from the sleeve actuator along the axial centerline.

According to still another aspect of the present disclosure, another assembly is provided for an aircraft propulsion system with an axial centerline. This assembly includes a translating sleeve, a sleeve actuator and a locking apparatus. The sleeve actuator is connected to the translating sleeve. The sleeve actuator is configured to axially translate the translating sleeve along the axial centerline between a stowed position and a deployed position. The locking apparatus includes a lock and a lock actuator. The lock is configured as or otherwise includes a locking element. The lock actuator is configured to move the locking element between a locked position and an unlocked position. The locking element is configured to lock the translating sleeve in the stowed position when the locking element is in the locked position. At least when the locking element is in the locked position. An engagement between the lock actuator and the lock is operable to sever without moving the locking element out of the locked position.

At least when the locking element is in the locked position, an engagement between the lock actuator and the lock may be operable to sever without moving the locking element out of the locked position.

The first portion may be configured as or otherwise include the lock. The second portion may be configured as or otherwise include at least a portion of the lock actuator.

The lock may be disposed an axial distance along the axial centerline from the sleeve actuator.

The sleeve actuator and the first portion may be at least partially in a rotor burst zone of the aircraft propulsion system. The second portion may be outside of the rotor burst zone.

The lock may be disposed aft of the actuator along the axial centerline.

An actuator element of the lock actuator may engage the lock when the locking element is in the locked position. The actuator element may be disengaged from the lock when the locking element is in the unlocked position.

An actuator element of the lock actuator may be configured to drive the locking element from the unlocked position to the locked position. The actuator element may contact, but may not be attached to, the lock.

The lock actuator may be connected to the lock through a frangible linkage.

At least when the locking element is in the locked position, an engagement between the lock actuator and the lock may be operable to sever without moving the locking element out of the locked position.

The assembly may also include a stationary structure. The locking apparatus may be secured to the stationary structure.

The locking element may be configured as or otherwise include a lock pin.

An actuator element of the lock actuator may be configured to drive the locking element from the unlocked position to the locked position. The actuator element may move along a first axis. The locking element may move along a second axis that is angularly offset from the first axis.

The assembly may also include an actuator lock configured with the actuator. The actuator lock may be configured to lock the translating sleeve in the stowed position.

The lock actuator may at least partially axially overlap the sleeve actuator along the axial centerline. The lock may be disposed an axial distance away from the sleeve actuator along the axial centerline.

An actuator element of the lock actuator may engage the lock when the locking element is in the locked position. The actuator element may be disengaged from the lock when the locking element is in the unlocked position.

The lock actuator may be connected to the lock through a frangible linkage.

The foregoing features and the operation of the invention will become more apparent in light of the following description and the accompanying drawings.

DETAILED DESCRIPTION

Figure 1:
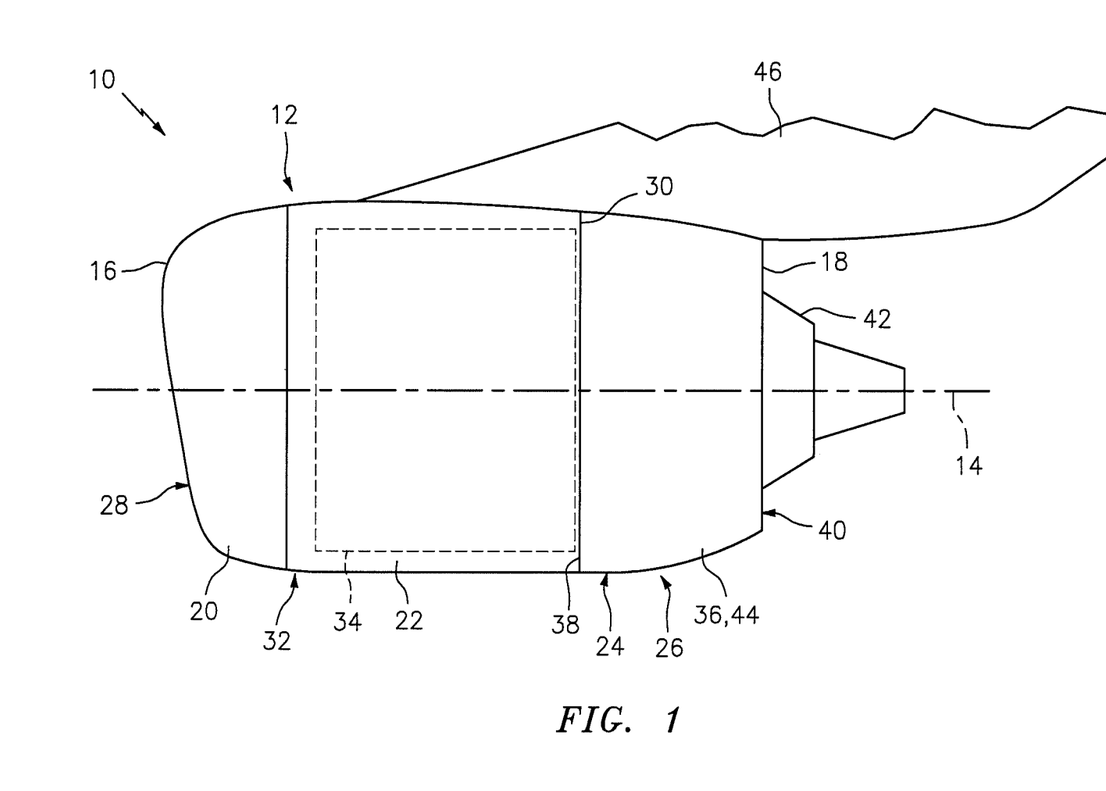
FIG. 1 is a side diagrammatic illustration of a propulsion system with a translating sleeve in a stowed position.

FIG. 1 illustrates an aircraft propulsion system 10 for an aircraft such as, but not limited to, a commercial airliner or cargo plane. The propulsion system 10 includes a nacelle 12 and a gas turbine engine. This gas turbine engine may be configured as a high-bypass turbofan engine. Alternatively, the gas turbine engine may be configured as any other type of gas turbine engine capable of propelling the aircraft during flight.

The nacelle 12 is configured to house and provide an aerodynamic cover for the gas turbine engine. The nacelle 12 extends along an axial centerline 14 between a nacelle forward end 16 and a nacelle aft end 18. The nacelle 12 of FIG. 1 includes a nacelle inlet structure 20, one or more fan cowls 22 (one such cowl visible in FIG. 1) and a nacelle aft structure 24, which is configured as part of or includes a thrust reverser system 26.

The inlet structure 20 is disposed at the nacelle forward end 16. The inlet structure 20 is configured to direct a stream of air through an inlet opening 28 at the nacelle forward end 16 and into a fan section of the gas turbine engine.

The fan cowls 22 are disposed axially between the inlet structure 20 and the aft structure 24. Each fan cowl 22 of FIG. 1, in particular, is disposed at an aft end 30 of a stationary portion 32 of the nacelle 12, and extends forward to the inlet structure 20. Each fan cowl 22 is generally axially aligned with a fan section of the gas turbine engine. The fan cowls 22 are configured to provide an aerodynamic covering for a fan case 34. Briefly, this fan case 34 circumscribes the fan section and partially forms a forward outer peripheral boundary of a bypass flowpath of the propulsion system 10.

The term "stationary portion" is used above to describe a portion of the nacelle 12 that is stationary during propulsion system 10 operation (e.g., during takeoff, aircraft flight and landing). However, the stationary portion 32 may be otherwise movable for propulsion system inspection/maintenance; e.g., when the propulsion system 10 is non-operational. Each of the fan cowls 22, for example, may be configured to provide access to components of the gas turbine engine such as the fan case 34 and/or peripheral equipment configured therewith for inspection, maintenance and/or otherwise. In particular, each of fan cowls 22 may be pivotally mounted with the aircraft propulsion system 10 by, for example, a pivoting hinge system. Alternatively, the fan cowls 22 and the inlet structure 20 may be configured into a single axially translatable body for example, which may be referred to as a "fanlet". The present disclosure, of course, is not limited to the foregoing fan cowl configurations and/or access schemes.

The aft structure 24 includes a translating sleeve 36 for the thrust reverser system 26. The translating sleeve 36 of FIG. 1 is disposed at the nacelle aft end 18. This translating sleeve 36 extends axially along the axial centerline 14 between a forward end 38 thereof and the nacelle aft end 18. The translating sleeve 36 is configured to partially form an aft outer peripheral boundary of the bypass flowpath. The translating sleeve 36 may also be configured to form a bypass nozzle 40 for the bypass flowpath with an inner structure 42 of the nacelle 12 (e.g., an inner fixed structure (IFS)), which nacelle inner structure houses a core of the gas turbine engine.

The translating sleeve 36 of FIG. 1 includes a pair of sleeve segments 44 (e.g., halves) arranged on opposing sides of the propulsion system 10 (one such sleeve segment visible in FIG. 1). The present disclosure, however, is not limited to such an exemplary translating sleeve configuration. For example, the translating sleeve 36 may alternatively have a substantially tubular body. For example, the translating sleeve 36 may extend more than three-hundred and thirty degrees (330°) around the centerline 14.

Figure 2:
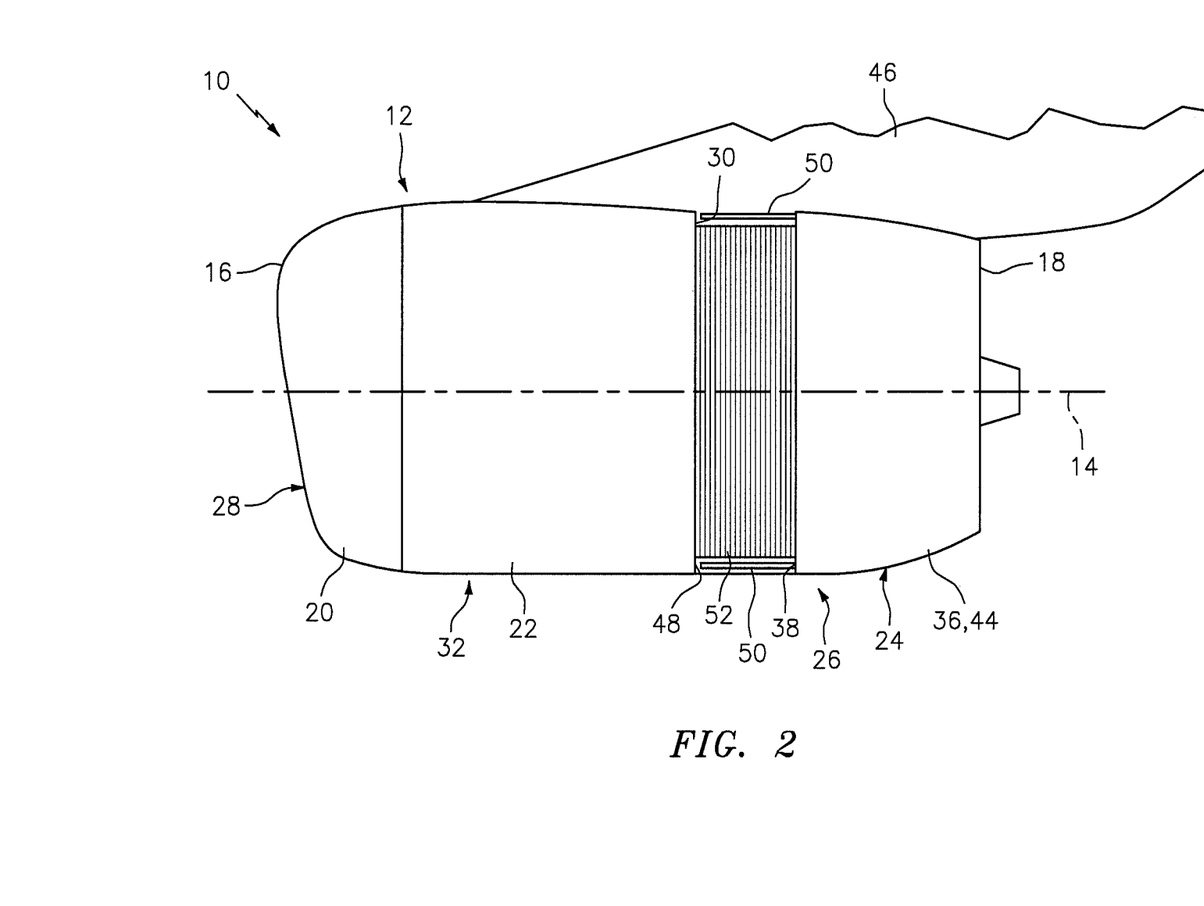
FIG. 2 is a side diagrammatic illustration of the propulsion system with the translating sleeve in a deployed position.

Referring to FIGS. 1 and 2, the translating sleeve 36 is an axially translatable structure. Each translating sleeve segment 44, for example, may be slidably connected to one or more stationary structures (e.g., a pylon 46 and a lower bifurcation 48) through one or more respective track assemblies 50 (see FIG. 2). Each track assembly 50 may include a rail mated with a track beam; however, the present disclosure is not limited to the foregoing exemplary sliding connection configuration.

With the foregoing configuration, the translating sleeve 36 may translate axially along the axial centerline 14 and relative to the stationary portion 32. The translating sleeve 36 may thereby move axially between a forward stowed position (see FIG. 1) and an aft deployed position (see FIG. 2). In the forward stowed position, the translating sleeve 36 provides the functionality described above. In the aft deployed position, the translating sleeve 36 at least partially (or substantially completely) uncovers at least one or more other components of the thrust reverser system 26 such as, but not limited to, one or more cascade structures 52. In addition, as the translating sleeve 36 moves from the stowed position to the deployed position, one or more blocker doors (not shown) arranged with the translating sleeve 36 may be deployed to divert bypass air from the bypass flowpath and through the cascade structures 52 to provide reverse thrust.

Figure 3:
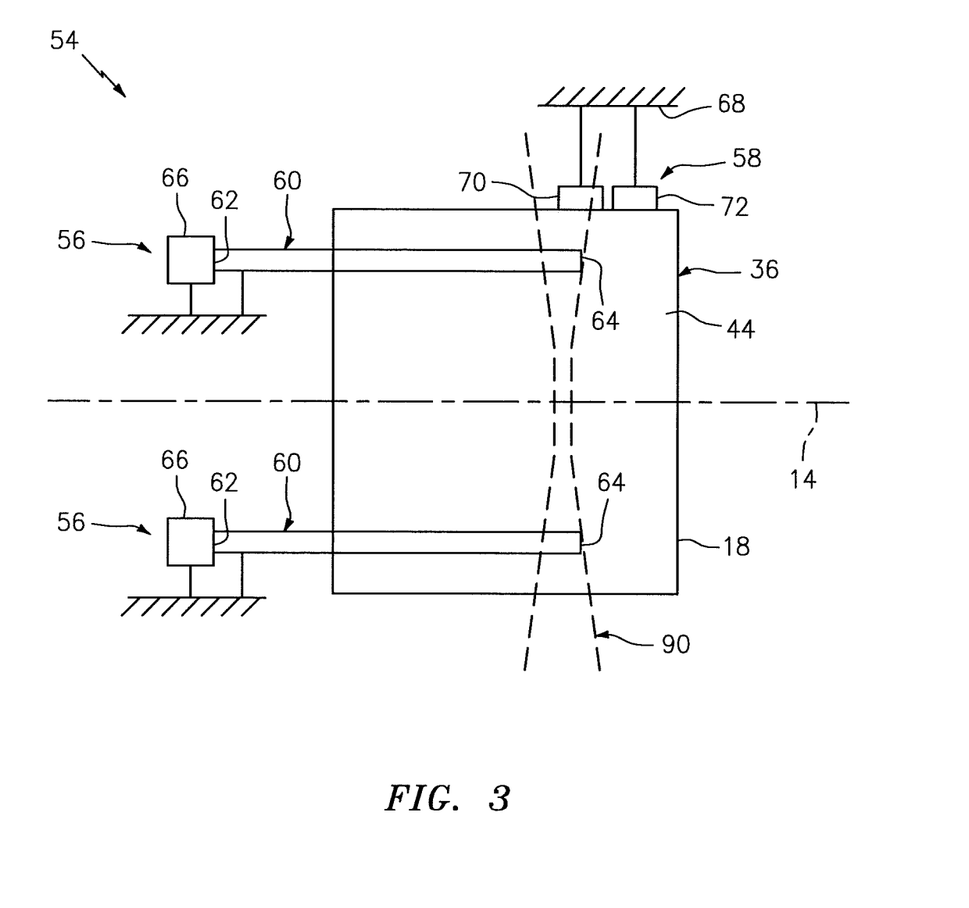
FIG. 3 is a schematic illustration of a system for controlling movement of a segment of the translating sleeve.

FIG. 3 is a schematic illustration of a system 54 for controlling movement of one of the sleeve segments 44 and, thus, the translating sleeve 36. This control system 54 includes one or more sleeve actuator assemblies 56 and a locking apparatus 58.

Each of the sleeve actuator assemblies 56 includes a sleeve actuator 60, which is configured to drive the sleeve segment 44 between the forward stowed position (see FIG. 1) and the aft deployed position (see FIG. 2). The sleeve actuator 60, for example, may be configured as a linear actuator such as a hydraulic or pneumatic piston or a lead screw device. A forward end 62 of the sleeve actuator 60 is grounded. For example, the forward end 62 may be attached to the stationary structure (e.g., 46 or 48; see FIG. 2) or the stationary portion 32. An aft end 64 of the sleeve actuator 60 is attached to the sleeve segment 44, or otherwise indirectly motively linked with the sleeve segment 44.

Each of the sleeve actuator assemblies 56 also includes an actuator lock 66. This actuator lock 66 is configured to lock and unlock the sleeve actuator 60. When the sleeve actuator 60 is locked, the translating sleeve 36 is in the stowed position (see FIG. 1) and the actuator lock 66 prevents the sleeve actuator 60 from actuating and, thus, moving out of the stowed position. When the sleeve actuator 60 is unlocked, the actuator lock 66 enables sleeve actuator 60 actuation. Since the aft end 64 of the sleeve actuator 60 is attached to the sleeve segment 44, the actuator lock 66 is also operable to indirectly lock and unlock the sleeve segment 44 and, thereby, respectively prevent and enable axial translation of the sleeve segment 44. Various types and configurations of sleeve actuators and actuator locks are known in the art, and the present disclosure is not limited to any particular ones thereof.

Figure 4:
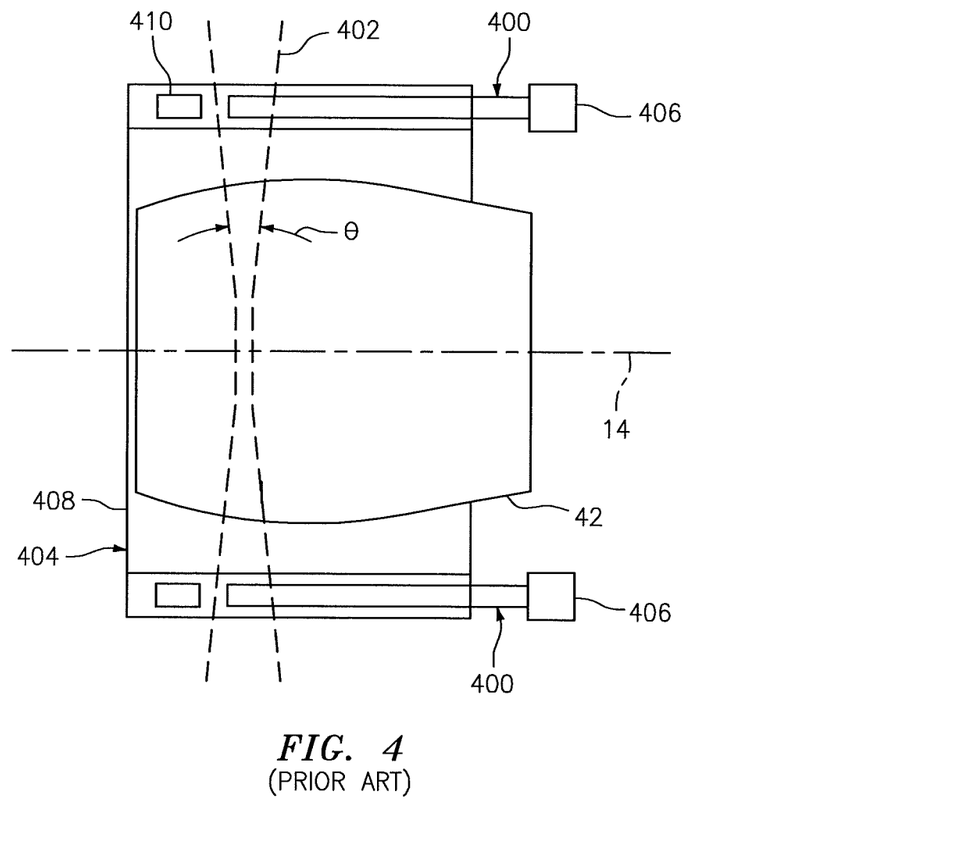
FIG. 4 is a schematic illustration of a prior art system for controlling movement of a segment of a translating sleeve.
Figure 5:
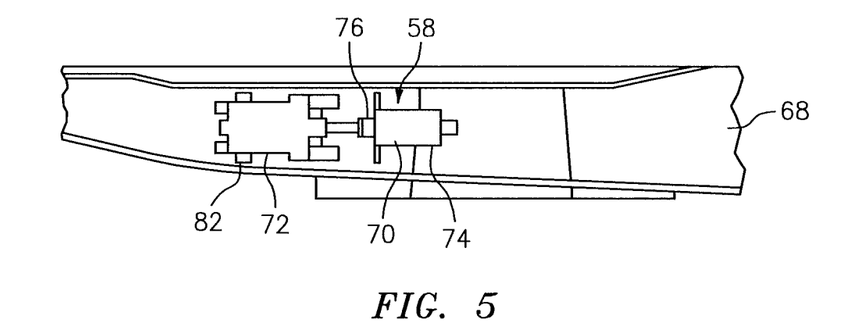
FIG. 5 is a side diagrammatic illustration of a locking apparatus for the control system of FIG. 3.

Referring to FIG. 4, in an unlikely event of a turbine failure during propulsion system operation, one or more turbine blades and/or fragments thereof (hereinafter collectively referred to as "projectiles") from a stage of the turbine may be ejected radially outward. In such an unlikely event, the projectiles may collide with one or both of the sleeve actuators 400 within a rotor burst zone (RBZ) 402. The term "rotor burst zone" refers to a region in which a projectile may travel radially outward. A lower energy rotor burst zone may be defined by a +/−fifteen degree angle θ. A higher energy rotor burst zone may be defined by about a +/−five degree angle θ. Of course, the present disclosure is not limited to the foregoing exemplary values.

If a projectile collision damages both sleeve actuators 400 (e.g., cuts through the sleeve actuators or disconnects the sleeve actuators from, for example, the translating sleeve 404), the actuator locks 406 may no long be operable to lock and thereby prevent axial translation of a sleeve segment 408. As a result, the flow within a bypass flowpath and/or air flow outside of the propulsion system may cause the sleeve segment 408 to open during flight of the aircraft. The opening of the sleeve segment 408 may, in turn, cause blocker doors (not shown) to deploy within the bypass flowpath and thereby significantly reduce propulsion system thrust.

To prevent deployment of the translating sleeve 404 (e.g., one or more of the sleeve segments 408), the propulsion system may include a tertiary locking apparatus 410 (e.g., a backup/failsafe lock apparatus). Such a tertiary locking apparatus 410 may directly lock the translating sleeve 404 to ground; e.g., a track beam. To ensure this tertiary locking apparatus 410 does not fail during a projectile collision as described above, the entire tertiary locking apparatus 410 is located outside of the rotor burst zone 402; e.g., axially aft of the actuator assemblies. While such placement may prevent disabling both the actuator locks 406 and the tertiary locking apparatus 410 during a single rotor burst event, such placement may require a length of the translating sleeve 404 to be extended axially aft to provide additional room for the tertiary locking apparatus 410.

In an effort to increase propulsion system efficiency, a modern nacelle and thrust reverser system may be designed to be more compact and thereby provide shorter aero lines. This may result in decreasing the axial length of the translating sleeve, which may create packaging challenges for locating an entire tertiary locking apparatus out of a rotor burst zone (e.g., a higher energy rotor burst zone). The locking apparatus 58 of FIG. 3 is configured and located in a manner to accommodate the foregoing challenges as described below.

The locking apparatus 58 of FIG. 3 is configured as a tertiary, track lock. The locking apparatus 58, for example, may be configured to directly lock the translating sleeve 36 to ground 68; e.g., the track beam.

Figure 6:
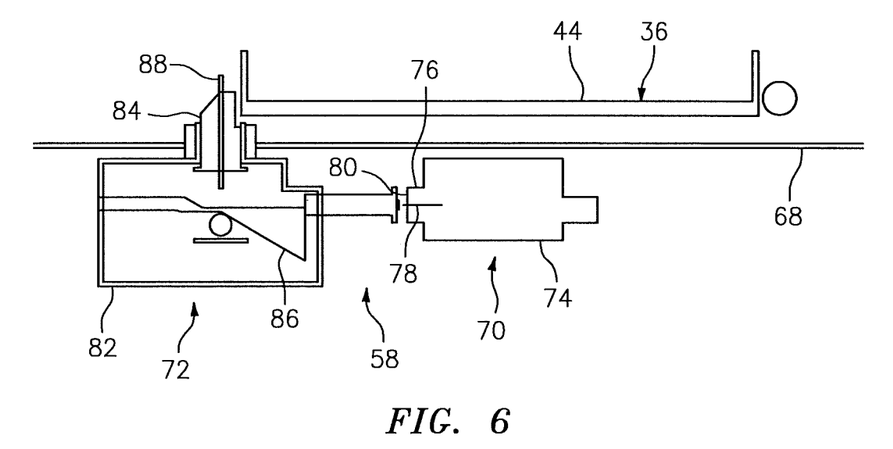
FIG. 6 is a schematic illustration of the locking apparatus where the translating sleeve segment is locked.
Figure 7:
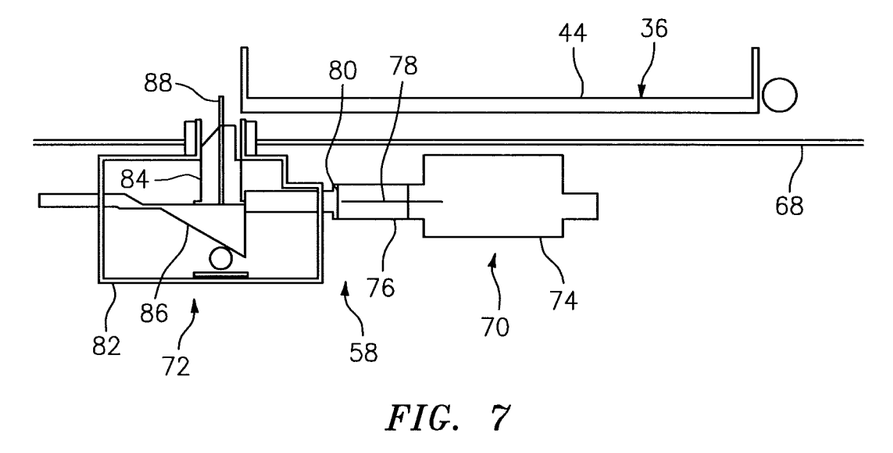
FIG. 7 is a schematic illustration of the locking apparatus where the translating sleeve segment is unlocked.
Figure 8:
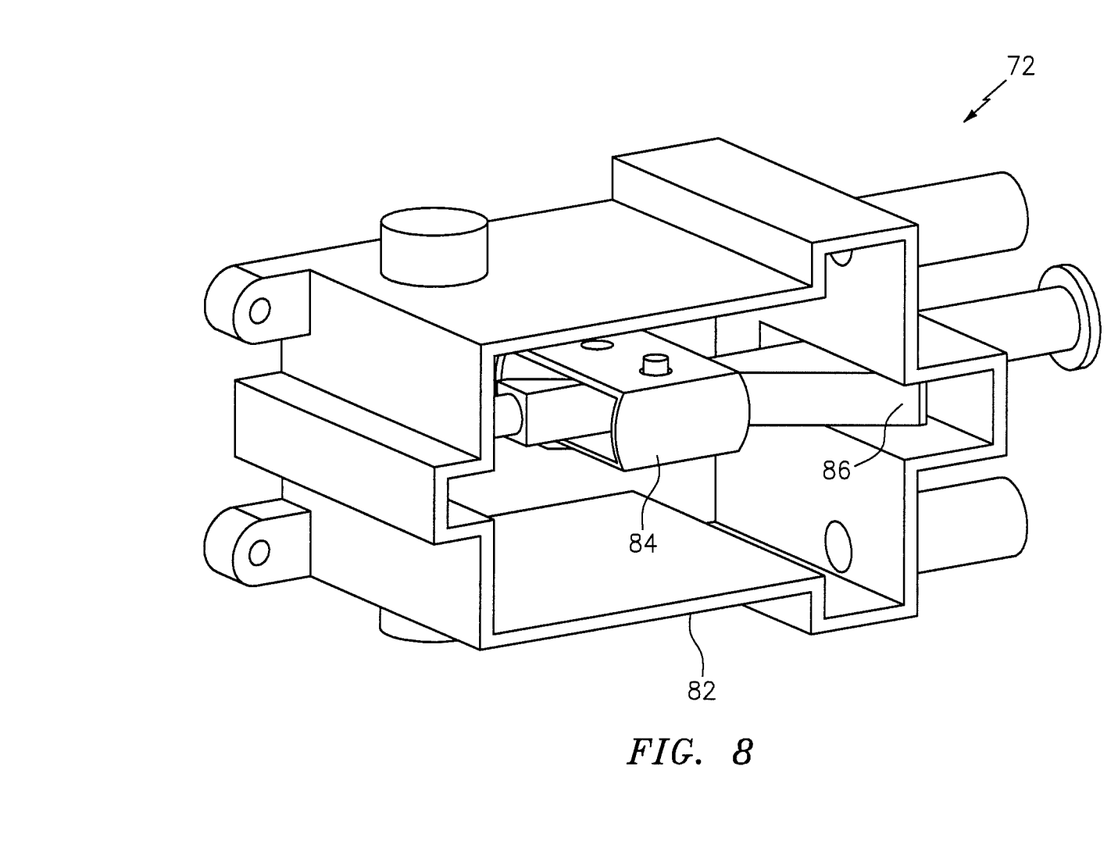
FIG. 8 is a perspective illustration of a lock of the locking apparatus.

Referring to FIGS. 5-8, the locking apparatus 58 includes a lock actuator 70 (e.g., a motivator) and a lock 72. A housing 74 of the lock actuator 70 is attached to the ground 68 (e.g., the track beam) such that the housing 74 is axially stationary and anchored. Referring to FIGS. 6 and 7, the lock actuator 70 includes an actuator element 76 (e.g., a piston) having an axis 78, which may be generally parallel with the axial centerline 14. The actuator element 76 is configured to move along the axis 78 between a retracted, locked position (see FIG. 6) and an extended, unlocked position (see FIG. 7). When the actuator element 76 is in the locked position of FIG. 6, a distal end 80 of the actuator element 76 may be completely disengaged (e.g., physically disconnected) from the lock 72. However, when the actuator element 76 is in the unlocked position of FIG. 7, the distal end 80 of the actuator element 76 is engaged with (e.g., contacts) the lock 72. Of course, in other embodiments, the distal end 80 of the actuator element 76 may engage the lock 72 even in the locked position where, for example, the actuator element 76 only contacts the lock 72 (e.g., is not fastened, bonded or otherwise attached to the lock 72).

A housing 82 of the lock 72 is also attached to the ground 68 (e.g., the track beam) such that the housing 82 is axially stationary and anchored. The lock 72 includes a locking element 84 (e.g., a lock pin or bolt) and a driver 86; see also FIG. 8. The locking element 84 has an axis 88, which may be angularly offset from (e.g., perpendicular to) the axis 78. The locking element 84 is configured to move along the axis 88 between an extended, locked position (see FIG. 6) and a retracted, unlocked position (see FIG. 7). When the locking element 84 is in the locked position of FIG. 6, the locking element 84 projects out from the housing 82 and provides an axial stop for the translating sleeve 36. For example, a biasing element 87 (e.g., a spring) may be configured with the locking element 84 to bias (e.g., push) the locking element 84 into the locked position of FIG. 6. When the locking element 84 is in the unlocked position of FIG. 7, the locking element 84 is retracted at least partially back into the housing 82 and enables the translating sleeve 36 to move axially along the axial centerline 14.

The driver 86 is configured to translate the movement along the axis 78 into movement along the axis 88. For example, when the actuator element 76 pushes the driver 86 along the axis 78, the driver 86 in turn pushes the locking element 84 along the axis 88. The driver 86 of FIGS. 6 and 7 is configured as a wedge element; however, various other driver configurations may be implemented for the lock 72; e.g., a gear system, etc.

Referring again to FIG. 3, the entire lock 72 is located outside of a rotor burst zone 90 (e.g., a higher energy rotor burst zone) in which the aft end 64 of the sleeve actuator 60 is located. More particularly, the lock 72 is located aft of the sleeve actuator 60 such that the lock 72 is located an axial distance along the axial centerline 14 from the aft end 64 of the sleeve actuator 60. As a result, the sleeve actuator 60 does not axially overlap the lock 72 along the axial centerline 14. The lock actuator 70, in contrast, may be located partially or completely within the rotor burst zone 90. The lock actuator 70 of FIG. 3, for example, is at least partially axially (or may be completely) overlapped by the sleeve actuator 60 along the axial centerline 14.

In order to prevent unintended deployment of the translating sleeve 36 (e.g., one or more of the sleeve segments 44) after a projectile is ejected within the rotor burst zone 90, the locking apparatus 58 of FIG. 3 is configured such that an engagement between the lock 72 and the lock actuator 70 is severable as described above. For example, in the embodiment shown in FIGS. 5-7, while the locking element 84 engages the driver 86 to unlock the lock 72, the locking element 84 is disengaged and, thus, severed from and the driver 86 when the lock 72 is locked. Thus, even if the lock actuator 70 is damage by a projectile, the lock 72 may still be operable to lock 72 the translating sleeve 36 in place. For example, the locking actuator may be torn away or otherwise shifted by the projectile without also tearing away or otherwise shifting the lock 72.

Figure 9:
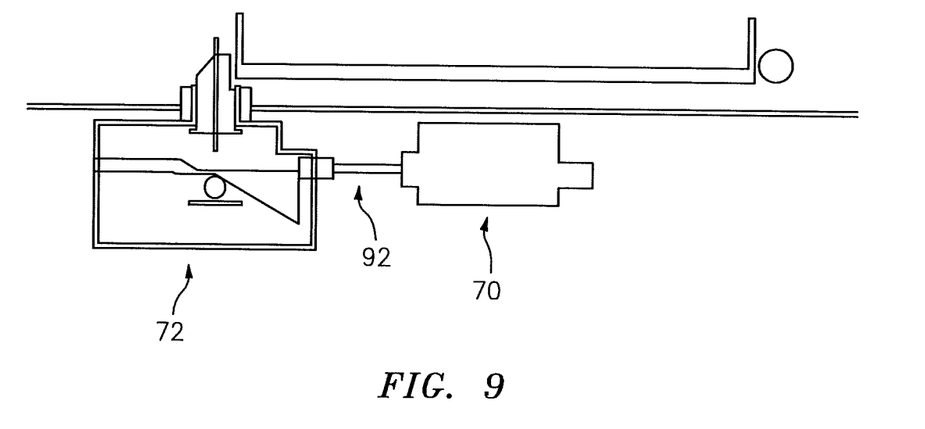
FIG. 9 is a schematic illustration of an alternate embodiment locking apparatus.

Referring to FIG. 9, in some embodiments, the lock 72 and the lock actuator 70 may be physically connected together by a frangible, severable linkage 92 (e.g., a link and/or joint). An example of such a linkage 92 is a small diameter pushrod, which may include a stress concentrator (e.g., a cut) or other feature operable to promote severing the pushrod when subjected to a force over a predetermined value. The present disclosure, however, is not limited to such an exemplary severable linkage.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. An assembly for an aircraft propulsion system with an axial centerline, comprising:
    a translating sleeve;
    a sleeve actuator connected to the translating sleeve, the sleeve actuator configured to move the translating sleeve along the axial centerline between a stowed position and a deployed position; and
    a locking apparatus including a lock and a lock actuator, the lock comprising a locking element, the lock actuator configured to move the locking element between a locked position and an unlocked position, and the locking element configured to lock the translating sleeve in the stowed position when the locking element is in the locked position;
    wherein a first portion of the locking apparatus axially overlaps the sleeve actuator along the axial centerline, and a second portion of the locking apparatus does not axially overlap the sleeve actuator along the axial centerline; and
    wherein the second portion comprises the lock, and the first portion comprises at least a portion of the lock actuator.

2. The assembly of claim 1, wherein the lock is disposed an axial distance along the axial centerline from the sleeve actuator.

3. The assembly of claim 1, wherein
    the sleeve actuator and the first portion are at least partially in a rotor burst zone of the aircraft propulsion system; and
    the second portion is outside of the rotor burst zone.

4. The assembly of claim 1, wherein the lock is disposed aft of the sleeve actuator along the axial centerline.

5. The assembly of claim 1, wherein an actuator element of the lock actuator engages the lock when the locking element is in the unlocked position, and the actuator element is disengaged from the lock when the locking element is in the locked position.

6. The assembly of claim 1, wherein
    an actuator element of the lock actuator is configured to drive the locking element from the locked position to the unlocked position; and
    the actuator element contacts, but is not attached to, the lock.

7. The assembly of claim 1, wherein the lock actuator is connected to the lock through a frangible linkage.

8. The assembly of claim 1, wherein, at least when the locking element is in the locked position, an engagement between the lock actuator and the lock is operable to sever without moving the locking element out of the locked position.

9. The assembly of claim 1, further comprising a stationary structure, wherein the locking apparatus is secured to the stationary structure.

10. The assembly of claim 1, wherein the locking element comprises a lock pin.

11. The assembly of claim 1, wherein
    an actuator element of the lock actuator is configured to drive the locking element from the locked position to the unlocked position;
    the actuator element moves along a first axis; and
    the locking element moves along a second axis that is angularly offset from the first axis.

12. The assembly of claim 1, further comprising an actuator lock configured with the sleeve actuator, wherein the actuator lock is configured to lock the translating sleeve in the stowed position.

* * * * *